United States Patent [19]

Dorsey

[11] Patent Number: 4,829,705
[45] Date of Patent: May 16, 1989

[54] CHUM BASKET

[76] Inventor: Harris J. Dorsey, 1917 Stella Cir., Port Neches, Tex. 77651

[21] Appl. No.: 213,280

[22] Filed: Jun. 29, 1988

Related U.S. Application Data

[60] Division of Ser. No. 133,186, Dec. 14, 1987, Pat. No. 4,790,104, which is a continuation of Ser. No. 860,049, May 6, 1986, abandoned, which is a continuation-in-part of Ser. No. 756,718, Jul. 19, 1985, abandoned.

[51] Int. Cl.$^4$ .............................................. A01K 97/02
[52] U.S. Cl. .................................... 43/44.99; 43/54.1
[58] Field of Search ...................... 43/41, 44.99, 54.1, 43/55, 42.06

[56] References Cited

U.S. PATENT DOCUMENTS 3,974,591  8/1976  Ray ..................................... 43/44.99
4,138,794  2/1979  Chiodini ............................. 43/44.99

FOREIGN PATENT DOCUMENTS 2126061  3/1984  United Kingdom ............... 43/44.99
2128061  4/1984  United Kingdom ............... 43/44.99
2186171  8/1987  United Kingdom ................ 43/54.1

Primary Examiner—Nicholas P. Godici
Assistant Examiner—William Scott Andes
Attorney, Agent, or Firm—Vaden, Eickenroht, Thompson & Boulware

[57] ABSTRACT

A chum basket having generally frusto-conically shaped sections which are jointed at their larger ends and which have perforations in their side walls, a device on the upper section by which the body may be suspended in the water, and a weight in the lower section to cause the body to assume a vertical position generally coaxial of its sections, the upper section having a door in the side thereof to permit access to the interior of the body.

1 Claim, 1 Drawing Sheet

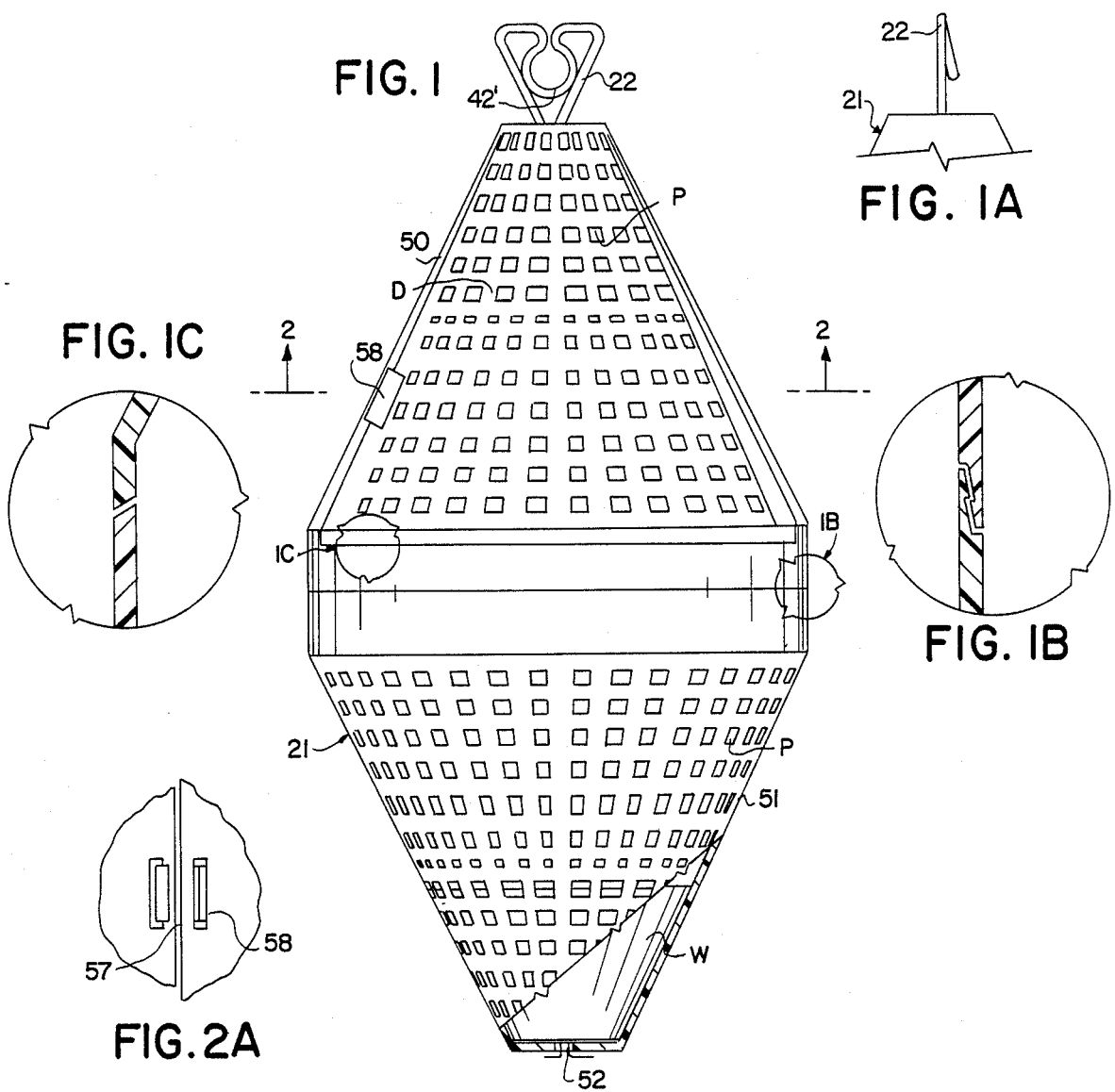
FIG. 1
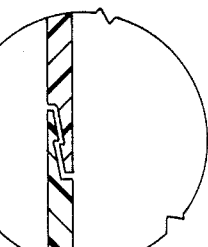
FIG. 1A
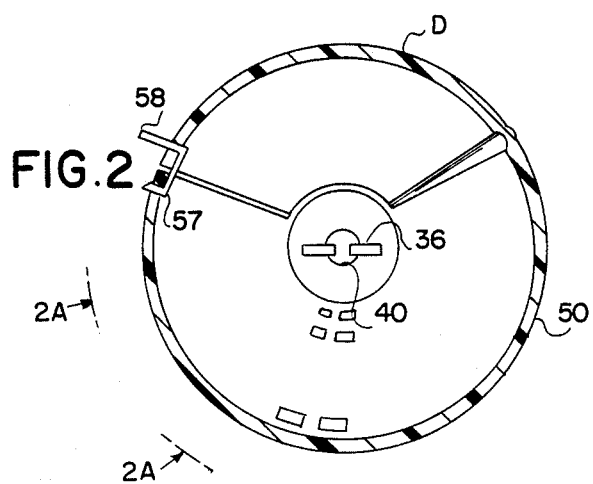

CHUM BASKET

This application is a division of my application, Ser. No. 133,186, filed Dec. 14, 1987, now U.S. Pat. No. 4,790,104, and entitled "Fishing Gear", which was a continuation of my now abandoned application, Ser. No. 860,049, filed May 6, 1986, which was a continuation-in-part of my now abandoned application, Ser. No. 756,718, filed July 19, 1985 now abandoned and entitled "Fishing Gear".

This invention relates generally to an improved chum basket.

As well known in the art, a trot line is made up of a string or other flexible line which is stretched across a narrow body of water and from which objects such as hooks, weight and/or chum baskets are suspended beneath the water surface. As also well known in the art, a chum basket comprises a container for fish food which is of such construction that the food is automatically dispensed therefrom as the container moves in the water, upon contact by a fish, due to water currents, or when induced by the fisherman.

Containers often used as chum baskets are of relatively heavy and expensive construction, and are not particularly well suited for stocking with fish food. It is an object of this invention to provide a chum basket which is of lightweight, inexpensive construction and which may be easily and quickly stocked.

In accordance with the object of the invention, the chum basket comprises an elongate body having generally frusto-conically shaped sections which are joined at their larger ends and which have perforations in their side walls, means on the upper section by which the body may be suspended in the water, and a weight in the lower section to cause the body to assume a vertical position generally axially of its sections, whereby vertical movement of the body causes water to circulate through its perforations in order to dispense particles of food therefrom. More particularly, the upper section has a door in its side to permit it to be filled with food without the necessity of disconnecting the sections from one another or otherwise, altering the integrity of the overall body.

In the drawings, wherein like reference characters are used throughout to designate like parts:

FIG. 1 is an elevational view of the side of a chum basket constructed in accordance with the present invention, and suspended from a trot line and broken away in part to show a weight in its lower end;

FIG. 1A is a side view of the device by which the chum basket is suspended from the trot line, as shown in FIG. 1;

FIG. 1B is a detailed, enlarged sectional view of a portion of the adjoining edges of the enlarged ends of body sections of the chum basket;

FIG. 1C is an enlarged, detailed sectional view of the adjacent edges of the door and door opening formed in the upper body section of the chum basket;

FIG. 2 is a horizontal sectional view of the upper body section of the chum basket, as seen along broken lines 2—2 of FIG. 1, and showing a latch which releasably secures the door to the door opening in the upper section; and FIG. 2A is a detailed, front view of the latch, as seen from broken lines 2A—2A of FIG. 2.

As shown, the chum basket 21 is made up of upper and lower generally frusto-conically shaped sections 50 and 51 of suitable plastic materials which have perforations P in their sides and are joined at their large ends. To facilitate joinder, these large ends have cylindrical portions which may be releasably secured to one another by the interlocking edges shown in FIG. 1B. As will be appreciated, the large ends of each of the body sections are flexible to permit them to be moved quickly into interlocking relation, and then released from interlocking relation by depression of the flexible portion which is on the inner side of the joint.

Each body section also has a flat portion at its smaller and which may be imperforate except for central holes. A hole 40 in the upper end of the upper body section 50 receives the outwardly bent free ends 36 of a device 22 to permit the device to be attached to and detached from the chum basket. A hole 52 in the lower end of the lower body section, on the other hand, receives wires on the lower end of the weight "W" mounted within the lower end of the body section 51 so as to releasably hold it in place. As previously described, the weight, which may be of lead and is shaped to fit the end of the lower basket, will normally maintain the body of the chum basket in a vertical direction, so that when it is caused to bob up and down, water circulates through its perforations and thus agitates the fish food contained therein sufficiently to cause particles of it to be dispensed through the perforations.

As shown, each of the upper and lower body sections 50 and 51 is of the same shape so that each may be fabricated in the same mold. The body sections differ, however, in that the upper section 50 has an opening in its side which is opened and closed by a door D to permit access to the interior of the basket for stocking it with fish food. Thus, upon molding of the upper body section 50, the door may be cut therefrom, and then hingedly mounted to one side of the opening, as shown in FIG. 2.

The door extends vertically throughout much of the length of the upper body section, and, as shown in FIG. 2, may extend angularly about approximately one-third of the circumference of the body section. The door is releasably held in closed position by means of a latch 57 comprising a "U" shaped mounted at one end on a portion of the body section adjacent the door opening, and having a free end 58 which extends laterally over the inside of the adjacent portions of the door opening and one edge of the door, and then projects through a slot in the door to provide a part which may be depressed inwardly in order to release the door for opening. The opposite vertical edge of the door is suitably hinged to the adjacent door opening, as by means of a molded part between them. As shown in FIG. 1C, the adjacent edges of the door and door opening are preferably chambered so as to provide a stop as the door is swung to a closed position.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matters herein set forth or shown in the accompanying drawings is to be interpreted as illustrative and not in a limiting sense.

What is claimed:

1. A chum basket, comprising an elongate body having generally frusto-conically shaped sections which are fabricated from the same mold, said sections being joined at their larger ends by overlapping cylindrical portions which are of relatively short longitudinal extent relative to the frusto-conically shaped sections, said sections having perforations in their side walls, means on the upper section by which the body may be suspended in the water, a separate weight held in the lower section to cause the body to assume a vertical position generally coaxially to its sections, whereby vertical movement of the body causes water to circulate through its perforations, said upper section having a door in the side thereof to permit access to the interior of the body.

* * * * *